US007495680B2

(12) United States Patent
Kimura

(10) Patent No.: US 7,495,680 B2
(45) Date of Patent: Feb. 24, 2009

(54) IMAGE SIGNAL PROCESSING APPARATUS AND DISPLAYING METHOD

(75) Inventor: Tomohiro Kimura, Kanagawa (JP)

(73) Assignee: Sony Corporation (JP)

( * ) Notice: Subject to any disclaimer, the term of this patent is extended or adjusted under 35 U.S.C. 154(b) by 579 days.

(21) Appl. No.: 10/822,198

(22) Filed: Apr. 9, 2004

(65) Prior Publication Data

US 2004/0233229 A1 Nov. 25, 2004

(30) Foreign Application Priority Data

May 22, 2003 (JP) ........................... P2003-144864
Mar. 5, 2004 (JP) ........................... P2004-062208

(51) Int. Cl.
*G09G 5/02* (2006.01)
*H04N 7/01* (2006.01)

(52) U.S. Cl. ....................... 345/698; 345/696; 345/694; 348/445; 348/558; 348/173

(58) Field of Classification Search ......... 345/690–698; 348/E7.002, E5.135, 173, 558, 445, 333.02
See application file for complete search history.

(56) References Cited

U.S. PATENT DOCUMENTS 6,476,824 B1 * 11/2002 Suzuki et al. ............... 345/694
7,190,401 B2 * 3/2007 Hara et al. ............. 348/333.02

FOREIGN PATENT DOCUMENTS

JP 2001306026 11/2001
JP 2002323872 11/2002

* cited by examiner

*Primary Examiner*—Kevin M Nguyen
(74) *Attorney, Agent, or Firm*—Lerner, David, Littenberg, Krumholz & Mentlik, LLP

(57) ABSTRACT

A display apparatus that displays a composite image signal obtained by combining an image signal for a side panel with an input image signal corresponding to a picture region and carries out a picture display based on peak luminance enhancement control, first detects an average brightness level of the input image signals when generating the image signal for the side panel. This sets the brightness level of the image signal for the side panel before the composition based on the detection result of the average brightness level of the input image signals so as to obtain a display brightness level in which the visual brightness of the displayed side panel is substantially constant, as a result of the peak luminance enhancement control. Accordingly, the brightness of the side panel becomes constant, thereby alleviating a burn-in phenomenon.

9 Claims, 13 Drawing Sheets

FIG. 10

| APL OF 4:3 PICTURE+ SIDE PANEL (%) | SIDE PANEL DATA (/255) | ACTUAL BRIGHTNESS (cd/m2) | APPARENT BRIGHTNESS (cd/m2) |
|---|---|---|---|
| 0 | 6 | 9.4 | 10±1 |
| 1 | 6 | 9.3 | 10±1 |
| 2 | 7 | 10.7 | 10±1 |
| 3 | 7 | 10.6 | 10±1 |
| 4 | 7 | 10.4 | 10±1 |
| 5 | 7 | 10.3 | 10±1 |
| 6 | 7 | 10.2 | 10±1 |
| 7 | 7 | 10.0 | 10±1 |
| 8 | 7 | 9.9 | 10±1 |
| 9 | 7 | 9.7 | 10±1 |
| 10 | 7 | 9.6 | 10±1 |
| 11 | 7 | 9.5 | 10±1 |
| 12 | 8 | 10.7 | 10±1 |
| 13 | 8 | 10.5 | 10±1 |
| 14 | 8 | 10.4 | 10±1 |
| 15 | 8 | 10.2 | 10±1 |
| 16 | 8 | 10.0 | 10±1 |
| | | | |
| | | | |
| 95 | 26 | 10.2 | 10±1 |
| 96 | 26 | 10.2 | 10±1 |
| 97 | 26 | 10.2 | 10±1 |
| 98 | 26 | 10.2 | 10±1 |
| 99 | 26 | 10.2 | 10±1 |
| 100 | 26 | 10.2 | 10±1 |

FIG. 11

| APL OF 4:3 PICTURE+ SIDE PANEL (%) | SIDE PANEL DATA (/255) | ACTUAL BRIGHTNESS (cd/m2) |
|---|---|---|
| 0 | 26 | 40.0 |
| 1 | 26 | 39.5 |
| 2 | 26 | 39.0 |
| 3 | 26 | 38.5 |
| 4 | 26 | 38.0 |
| 5 | 26 | 37.5 |
| 6 | 26 | 37.0 |
| 7 | 26 | 36.5 |
| 8 | 26 | 36.0 |
| 9 | 26 | 35.5 |
| 10 | 26 | 35.0 |
| 11 | 26 | 34.5 |
| 12 | 26 | 34.0 |
| 13 | 26 | 33.5 |
| 14 | 26 | 33.0 |
| 15 | 26 | 32.5 |
| 16 | 26 | 32.0 |
| | | |
| | | |
| 95 | 26 | 10.0 |
| 96 | 26 | 10.0 |
| 97 | 26 | 10.0 |
| 98 | 26 | 10.0 |
| 99 | 26 | 10.0 |
| 100 | 26 | 10.0 |

IMAGE SIGNAL PROCESSING APPARATUS AND DISPLAYING METHOD

BACKGROUND OF THE INVENTION

1. Field of the Invention

The present invention relates to a display apparatus for receiving an image signal and carrying out an image display, and a picture display method in such a display apparatus.

2. Description of Related Art

As a display apparatus for picture display, a plasma display apparatus has been prevailing.

The principle of display operations in such a plasma display apparatus is the following, as is generally known. Gas is sealed in space formed, for example, by making two sheets of glass substrate face each other and surrounding it with a separation wall. Further, by applying a voltage on this gas, vacuum discharge is induced. Accordingly, within the space of the glass substrate, the gas is ionized and becomes at plasma state, thereby radiating ultraviolet rays. Here, if a fluorescent substance layer is preliminarily formed within the space between the glass substrates, the ultraviolet rays causes radiation of the visible light of a predetermined color by irradiating the fluorescent substance layer. The plasma display apparatus is configured to enable the display of colored picture by forming members corresponding to the three colors of R, G and B, as the fluorescent substance and display cells arranged in a matrix form or the like, and then achieving the above-mentioned discharge light emission phenomenon for each of the formed display cells.

One of display drive methods for the above-mentioned plasma display apparatus is a sub-field method.

The sub-field method is a drive method in which one field is divided into a plurality of sub-fields, and the light emission period of a display cell for each sub-field is controlled, thereby representing grayscale (brightness) of each display cell. Further, by controlling the grayscale of each display cell of R, G and B constituting single pixel, color reproduction of each pixel is achieved as well as the grayscale balance on the entire screen. In other words, color pictures may be represented.

Presently, the plasma display apparatus has low light emission efficiency at the time of display. For this reason, the case of displaying a bright image on the entire screen requires a considerably large amount of electric power. Accordingly, it is difficult to ignore an issue of an increase in an electric power consumption. Further, heat generation in circuits and display panel portion of the display apparatus is increased, thereby resulting decrease of reliability.

Accordingly, in the plasma display apparatus, so-called a PLE (Peak Luminance Enhancement) control is carried out when a picture is displayed. In the PLE control, firstly, for example, an average brightness level of image signals corresponding to the entire field screen is detected, and then a display brightness level, which is the brightness level to be used for actually carrying out the picture display, is set in accordance with the average brightness level. The drive operation based on, for example, the sub-field method is carried out so as to represent the grayscale corresponding to this set display brightness level.

The actual PLE control is designed so as to carry out the display of high brightness by setting the display brightness level high, if the average brightness level is low, even in the case of the signals having the same brightness level. On the contrary, if the average brightness level is high and bright, the display brightness level is set low, thereby limiting the electric power consumption.

Accordingly, the PLE control performed as mentioned above makes it possible to reduce the maximum electric power consumption, and further to enable display of images that are preferable in contrast.

As a display panel of the plasma display apparatus, a display panel with an aspect ratio of 16:9, which is longer in the lateral direction as compared with a standard aspect ratio of 4:3, is widely employed. When a picture having the aspect ratio of 4:3 is displayed on this display panel having the aspect ratio of 16:9, the picture having the aspect ratio of 4:3 is laterally expanded, in one method, to form a picture having the aspect ratio of 16:9.

However, if a picture having the aspect ratio of 4:3 is expanded to the picture having the aspect ratio of 16:9, the picture is laterally expanded and distorted for an amount corresponding to such an enlargement. In order to avoid such a distortion, a picture may alternatively be displayed, for example, as shown in FIG. 13A. In other words, the picture having the aspect ratio of 4:3 is displayed such that a picture area 201 is placed at a center in the lateral direction, on a display panel 200 having the aspect ratio of 16:9. In this case, no-picture regions on which a picture is not displayed are formed on both of right and left sides of the picture area 201. These regions are indicated as side panels 202, and designed so as to carry out the display, for example, by using a color and brightness close to black.

If such a display is utilized, although it results the side panel 202, the region on which no picture is displayed, the aspect ratio of 4:3 of the picture is maintained while the picture without any distortion is displayed.

Alternatively, as shown in FIG. 13B, a plurality of picture areas 201 may be set in the display panel 200. The side panel 202 may be set in regions outside the picture areas 201 within the display panel 200.

Strictly speaking, in view of the positional relation between the no-picture region and the picture areas 201 shown in FIG. 13B, the no-picture region may not be a side panel. However, in the present specification, if the no-picture region outside the picture area 201 within the display panel 200 is displayed, for example, in a color close to black, it is referred to as a side panel.

Further, as mentioned above, picture lights displayed in the plasma display apparatus is obtained from the visible light radiated from the fluorescent substance layers. However, it is known that this fluorescent substance layer is deteriorated in the course of use. Such a deterioration in the fluorescent substance is caused by the ultraviolet rays radiated by the vacuum discharge, impacts of ions generated within the vacuum space and the like.

Accordingly, the deterioration in the fluorescent substance is progressed as the accumulation time of the light emissions increases. In an actual display operation, the light emission accumulation times of the fluorescent substances corresponding to the respective display cells are not uniform, which causes variation on the basis of the pictures displayed up to now. In other words, the variation is induced in degrees of the deteriorations in the fluorescent substances among the display cells.

The deterioration in the fluorescent substance appears as an decrease of a light emission brightness. As mentioned above, the variation, which is induced in the degree of deterioration in the fluorescent substance corresponding to each display cell, results in variation of the light emission brightness of the fluorescent substance. For example, if the variation in the light emission brightness is induced among the fluorescent substances of R, G and B constituting one pixel, white balance may be disturbed.

Further, if the entire display screen is considered, there may be a case that a portion, which is a region that should be originally displayed with the same brightness and color as in its surrounding, may appear to have different brightness and color as the deterioration progresses. This is referred to as a so-called burn-in. If such a burn-in is generated, for example, a portion of the region in which the fluorescent substances are deteriorated may displays a fixed pattern and overlap with the original image. Accordingly, this is a known issue that causes deterioration of the display quality.

As a method of reducing the burn-in, for example, Japanese Patent Application Publication 2001-306026 was proposed. In this method, at first, it is judged whether a picture display by means of an input image signal is a moving picture display or a still picture display such as a fixed display of characters or the like. If it is judged as the moving picture display, for example, the usual PLE control is executed. However, if it is judged as the still picture display, the PLE control is not executed and a constant brightness display of a predetermined low brightness is carried out. According to the method described above, especially at the time of the still picture display, a difference in the brightness between the bright and dark regions of the picture is prevented to become larger. As a result, significant difference may not be generated in progressions of the deteriorations in the fluorescent substances, thereby reducing the burn-in.

Further, it is said that the burn-in is easily induced if a picture of fixed pattern with relatively higher contrast is displayed on the display panel for a long accumulation time. In other words, as compared with the fluorescent substance on a picture portion of darker display, the fluorescent substance of brighter picture portion has a longer light emission accumulation time. Accordingly, the degree of deterioration in the fluorescent substance differs greatly between the bright display region and the dark display region, thereby generating a burn-in with a clearly viewable boundary.

Accordingly, in the plasma display apparatus in which the side panel 202 is set in the display region as previously shown in FIGS. 13A, 13B, the burn-in may be easily induced in a boundary between the picture area 201 and the side panel 202.

Therefore, the plasma display apparatus is required to reduce such burn-in in order to deal with the case in which a picture is displayed together with the side panel 202. To do so, for example, it is also possible to apply the above described method for reducing the burn-in by turning the PLE control on or off in accordance with the decision result on whether the displayed picture is a moving picture display or a still picture display. If this method is applied, boundary between the picture area 201 and the side panel 202 is detected as the still picture, and the PLE control is turned off, and the constant low brightness is used for the display. However, for example, this may cause the display brightness in the picture area 201 to be dropped to a certain degree. In other words, the region of the side panel 202 has a brightness substantially equal to all black. If the display brightness of the picture area 201 is decreased, the progress of the deterioration in the fluorescent substance of the picture area 201 may be delayed, thereby delaying the progress of the burn-in as a result.

However, in this case, since the picture displayed on the picture area 201 is made darker, the image quality is deteriorated and it is not preferable.

Accordingly, in the present situation, the following method is widely employed on the contrary to the above. In the method, a certain degree of brightness is given to the side panel 202 which is in gray state under the PLE control that is normally executed. In this case, the deterioration in the fluorescent substance of the panel portion corresponding to the side panel 202 progresses in such a way that no large difference is generated between the progress of the deterioration in the fluorescent substance of the panel portion corresponding to the picture area 201 and that of the side panel, thereby delaying the progress of the burn-in.

SUMMARY OF THE INVENTION

However, if it is tried to reduce the burn-in with a certain degree of brightness in the side panel 202 as mentioned above, the following issues may become significant.

As mentioned above, in the plasma display apparatus, the PLE control is carried out in order to reduce the electric power consumption and obtain a preferable contrast. This PLE control is performed on the image signal corresponding to the display state on the display panel 200, for example, as shown in FIGS. 13A, 13B, in the case of executing the picture display in which the side panel 202 is placed. In other words, for the example shown in FIG. 13A, the PLE control is performed by inputting a composite image signal in a field unit obtained by compositing image signals for the side panels 202, 202 with an image signal having the aspect of 4:3 that corresponds to the picture area 201

The image signals for the side panels 202, 202 composited with the image signal of 4:3 corresponding to the picture area 201 has a preset constant brightness level. On the contrary, in the image signal of 4:3corresponding to the picture area 201, the brightness level is changed correspondingly to the actual picture content.

Accordingly, as a picture displayed by performing the PLE control on the composite image signal in which they are composited, the display brightness of the side panels 202, 202 is also changed in response to the brightness level change in the image signal corresponding to the picture area 201.

In other words, if the picture of the image signal corresponding to the picture area 201 is brighter, the average brightness level of the composite image signal becomes correspondingly higher. Accordingly, the PLE control is operated so as to suppress the display brightness of the entire field picture. Hence, the display brightness of the side panel 202 is also suppressed, and the actual displayed side panel 202 is changed so as to be darker.

On the other hand, if an image of the image signal corresponding to the picture area 201 becomes darker and the average brightness level of the composite image signal becomes lower, the PLE control is operated so as to make the display brightness of the entire field picture higher, thereby causing the actual displayed side panel 202 to change brighter.

In the display apparatus in which the PLE control is performed as mentioned above, the display brightness of the side panel dynamically changes on the basis of the brightness of the image signal corresponding to the picture portion, thereby causing an issue such that the entire picture displayed on the display panel is visually undesirable and its quality is not so high.

Accordingly, the present invention is made in view of the above described issue, and provides a display apparatus as follows. In other words, the display apparatus according to an embodiment of the present invention is configured to include: display means including a display screen; image signal generating means for generating an image signal corresponding to a no-picture region of a display region displayed on the display screen of the display means, the no-picture region being a remaining portion of the display region in which a picture region is excluded, the picture region being displayed on a basis of an input image signal; compositing means for generating a composite image signal in which an image signal for the no-picture region is composited with the input image signal; display brightness level setting means for setting a display brightness level on a basis of an average brightness level of the composite image signal from the compositing means; display drive means for driving the display means so as to obtain a brightness in accordance with the display brightness level set by said display brightness level setting means; average brightness level detecting means for detecting the average brightness level of the input image signal; and no-picture brightness level setting means for setting a brightness level of the image signal for the no-picture region in a basis of the average brightness level detected by the average brightness level detecting means, in such a way that a display brightness level at which a visual brightness of the no-picture region is substantially constant is set by the display brightness level setting means.

According to another embodiment of the present invention, there is provided a method of displaying a picture. The method is configured to include: a generating step for generating an image signal corresponding to a no-picture region of a display region displayed on the display screen of the display step, the no-picture region being a remaining portion of the display region in which a picture region is excluded, the picture region being displayed on a basis of an input image signal; a compositing step for generating a composite image signal in which an image signal for the no-picture region is composited with the input image signal; a setting step for setting a display brightness level on a basis of an average brightness level of the composite image signal; an average brightness level detecting step for detecting an average brightness level of the input image signal; and a no-picture brightness level setting step for setting a brightness level of the image signal for the no-picture region in a basis of the average brightness level detected by the average brightness level detecting step, in such a way that a display brightness level at which a visual brightness of the no-picture region is substantially constant is set by the display brightness level setting step.

According to the above-mentioned configurations, the present invention employs a basic configuration that allows display and output of the composite image signal obtained by compositing the image signal for the no-picture region with the input image signal corresponding to the picture region, and enables execution of picture display with the display brightness level set in accordance with the average brightness level for the composite image signal, namely, the picture display based on the PLE control.

In addition, in the configurations described above, it is designed so as to firstly detect the average brightness level of the input image signals if the image signal for the no-picture region is generated. Here, it is possible to recognize a change in the display brightness level of an image signal portion corresponding to the no-picture region, which is set by the display brightness level setting means (or the setting step) if the brightness of the image signal for the no-picture region before the composition is assumed to be a predetermined constant value by detecting the average brightness level of the input image signals.

The signal brightness level setting means (or the setting step) according to the present invention sets the display brightness level of the image signal portion corresponding to the no-picture region in accordance with the detection result of the average brightness level of the input image signal. Further, based on the above-mentioned descriptions, it is possible to set the display brightness level in which the visual brightness of the no-picture region is substantially constant.

According to still another embodiment of the present invention, there is provided a display apparatus including: a display including a display screen; an image signal generating section for generating an image signal corresponding to a no-picture region of a display region displayed on the display screen of the display, the no-picture region being a remaining portion of the display region in which a picture region is excluded, the picture region being displayed on a basis of an input image signal; a compositing section for generating a composite image signal in which an image signal for the no-picture region is composited with the input image signal; a display brightness level setting section for setting a display brightness level on a basis of an average brightness level of the composite image signal from the compositing section; a display driver for driving the display so as to obtain a brightness in accordance with the display brightness level set by said display brightness level setting section; an average brightness level detecting section for detecting the average brightness level of the input image signal; and a no-picture brightness level setting section for setting a brightness level of the image signal for the no-picture region in a basis of the average brightness level detected by the average brightness level detecting section, in such a way that a display brightness level at which a visual brightness of the no-picture region is substantially constant is set by the display brightness level setting section.

BRIEF DESCRIPTION OF THE DRAWINGS

FIG. 10 is an explanation view showing a specific example of properties of an actual brightness and an apparent brightness if brightness of a side panel image signal changes on the basis of an average brightness level of an image signal of a picture of 4:3;

FIG. 11 is an explanation view showing a specific example of property of an actual brightness if a brightness level of a side panel image signal is fixed;

DESCRIPTION OF THE EMBODIMENT

Figure 1:
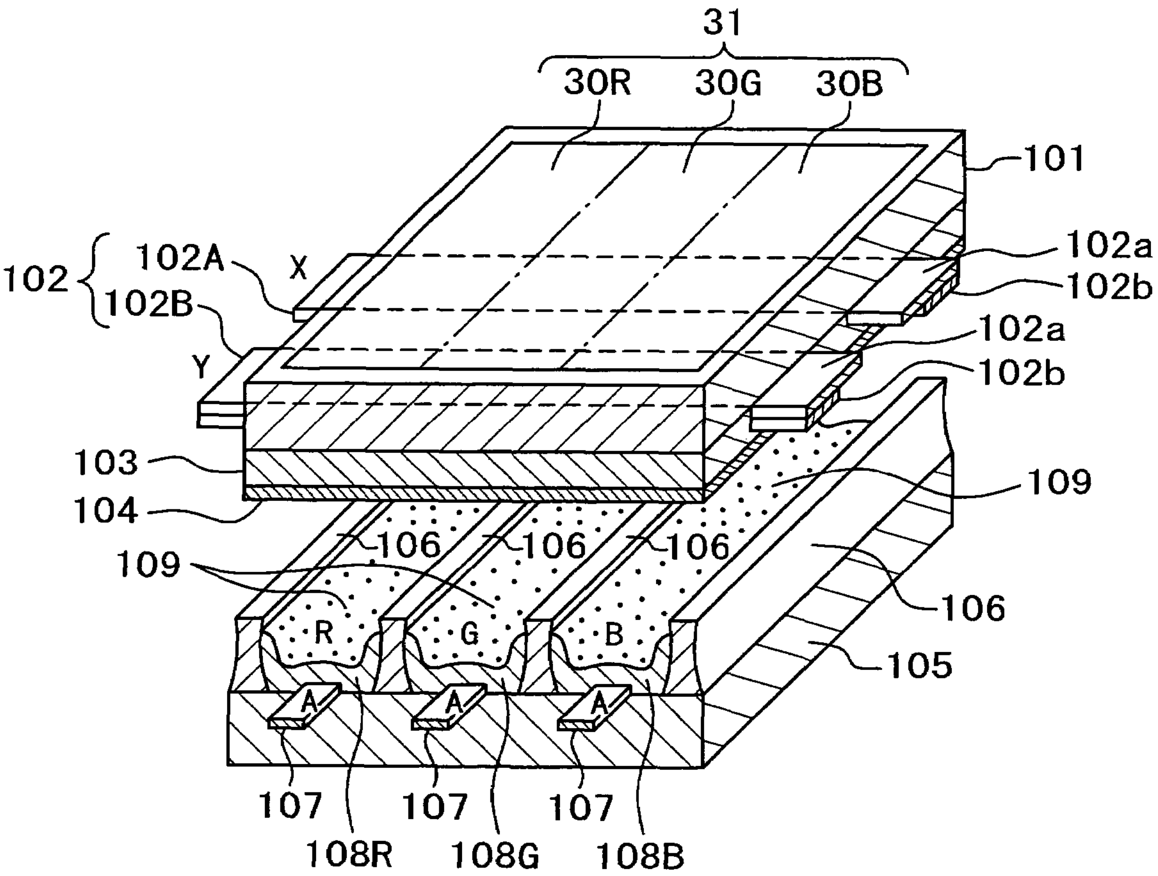
FIG. 1 is a perspective view showing a structure of a display panel of a plasma display apparatus as an embodiment of the present invention.

FIG. 1 shows a structure of a display panel of a plasma display apparatus which is an example of a display apparatus according to an embodiment of the present invention. In the present example, it is assumed that the plasma display apparatus is of an AC type (an alternating current type) and the display panel has a configuration of a surface discharging type employing a three-electrode structure.

As shown in FIG. 1, a transparent front glass substrate 101 is placed on the forefront of the display panel. A sustaining electrode 102 including an electrode X (102A) and an electrode Y (102B), which serve as a pair, is placed on the rear side of this front glass substrate 101. The electrode X (102A) and the electrode Y (102B) are placed in parallel at a predetermined interval, for example, as shown in FIG. 1. The sustaining electrode 102 including the electrode X (102A) and the electrode Y (102B), which serve as the pair, forms a line as one column. Further, each of those electrode X (102A) and electrode Y (102B) is formed by the combination of a transparent conductive film 102*a* and a metal film (bus conductor) 102*b*.

On the rear side of the front glass substrate 101, the sustaining electrode 102 (the electrode X (102A) and the electrode Y (102B)) is placed as mentioned above, and a dielectric layer 103 made of, for example, low melting point glass is further placed thereon. A protective film 104 made of, for example, MgO and the like is formed on the rear side of this dielectric layer 103.

Further, on the front side of a rear glass substrate 105, an address electrode 107 is placed in a direction orthogonal to the sustaining electrode 102 (the electrode X (102A) and the electrode Y (102B)). The address electrode forms a line as a row. Further, a separation wall 106 is formed between the address electrodes 107 adjacent to each other.

Further, fluorescent substance layers 108R, 108G and 108B of respective colors R, G and B are formed so as to be sequentially arrayed so as to cover the rear glass substrate top surface sections on which the respective address electrodes 107 are placed and the side wall sections of the separation walls 106 on both sides thereof.

Under the above-mentioned structure, the front side end of the separation wall 106 is actually fitted so as to contact with the protective film 104. Due to such structure, a discharge space 109 is formed in which the fluorescent substance layers 108R, 108G and 108B are formed. After this discharge space 109 is evacuated, gas, for example, such as neon (Ne), xenon (Xe), helium (He) and the like, is sealed therein.

Further, within the discharge space 109 in which this gas is sealed, surface discharge is induced between the electrode X (102A) and the electrode Y (102B). Accordingly, ultraviolet rays are radiated. Those ultraviolet rays cause the fluorescent substance layers 108 to be excited, thereby radiating the display light as the visible light.

Figure 2:
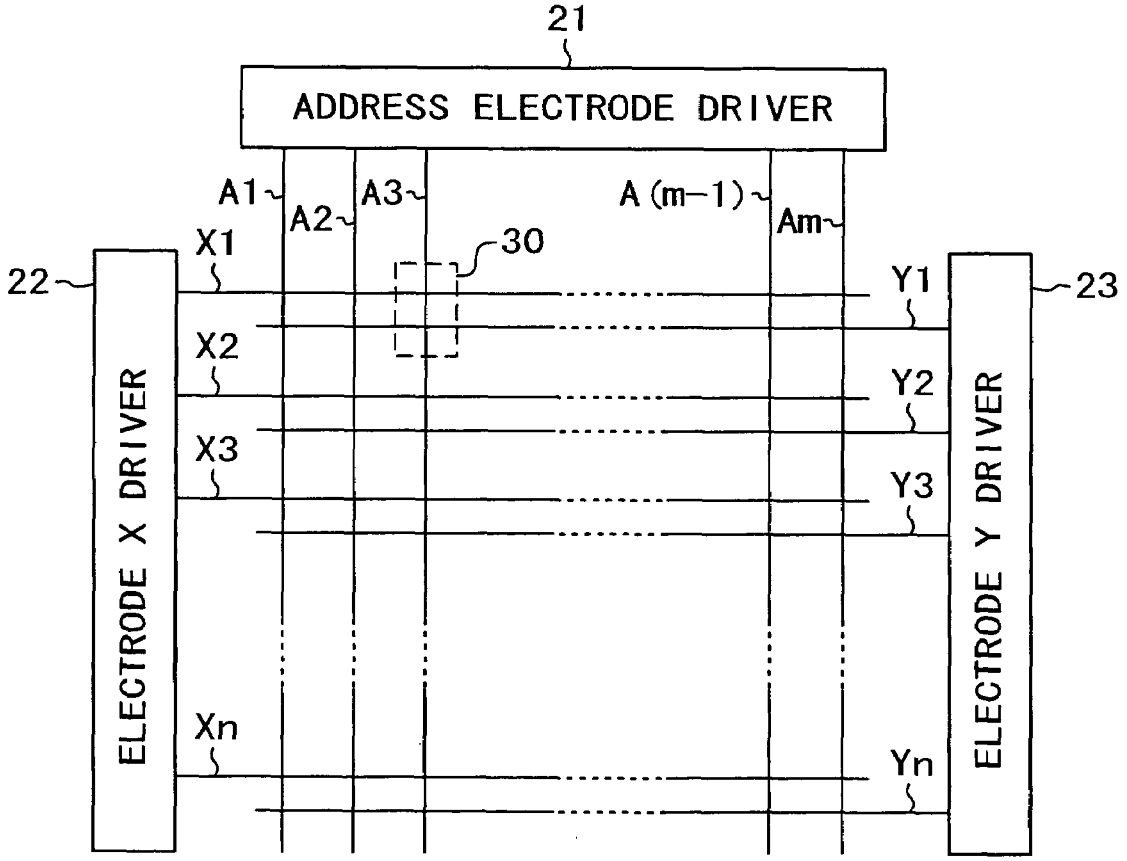
FIG. 2 is a view showing a configuration of an electrode driver and an electrode in a plasma display apparatus in an embodiment of the present invention.

FIG. 2 shows the configuration of a drive circuit system, in which the structure of the above-mentioned display panel is assumed.

For example, when it is considered as the entire display panel, in the electrode X (102A) as the sustaining electrode 102, electrodes X1 to Xn are arrayed horizontally from an upper direction to a lower direction. In the electrode Y (102B), similarly, electrodes Y1 to Yn are arrayed horizontally from the upper direction to the lower direction. Further, each set of [the electrode X1, the electrode Y1], [the electrode X2, the electrode Y2] . . . [the electrode Xn, the electrode Yn] forms the line in one column direction.

Further, in an address electrode A (107), address electrodes A1 to Am are arrayed vertically, for example, from a left-to-right direction, and a line in a row direction is formed.

Further, each of the crossings of the column direction lines including the paired sustaining electrodes (the electrodes X1 to Xn and the electrodes Y1 to Yn) and the row direction lines that serve as the address electrodes A1 to Am is formed as one cell (display cell) 30.

Figure 3:
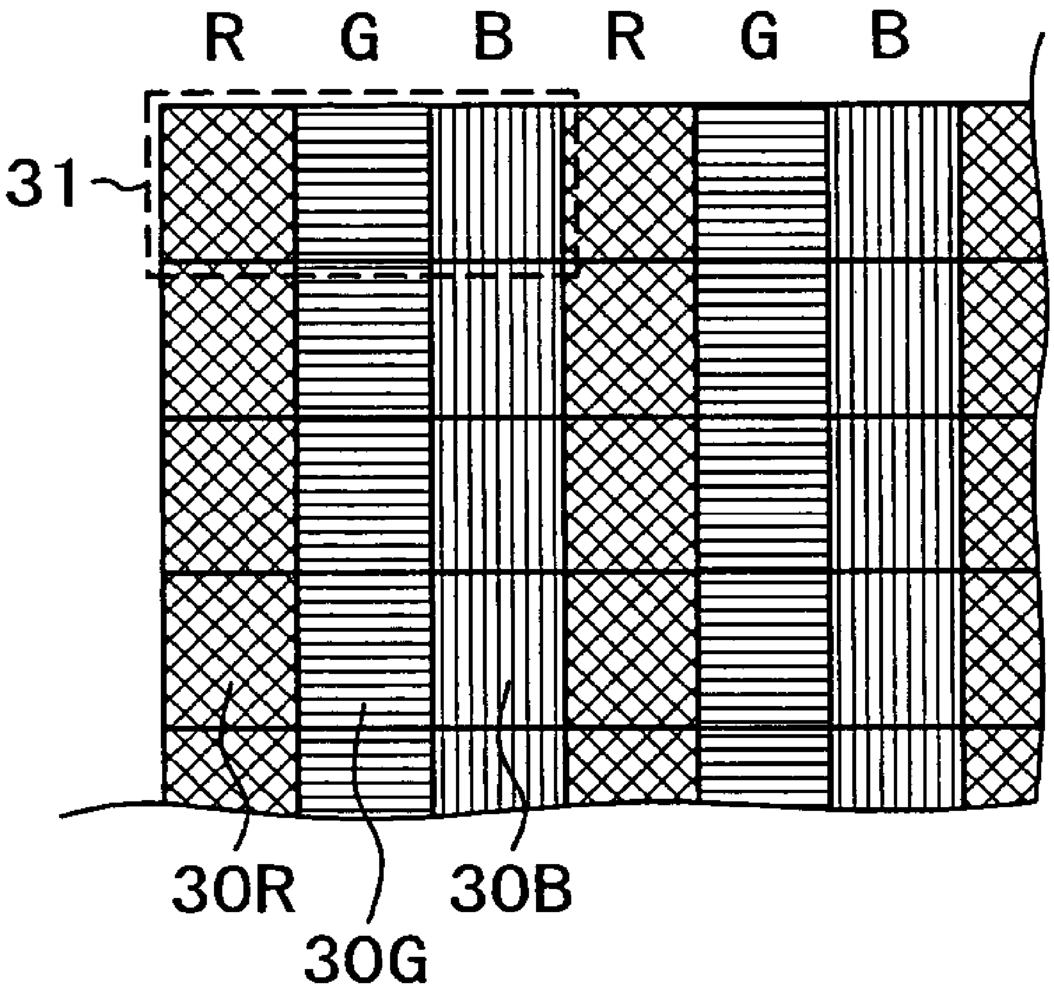
FIG. 3 is a view showing a relation between R, G and B cells and pixels in a display panel in an embodiment of the present invention.

The cell 30 in the present specification indicates a structure body portion of the display panel including the positions at which the sustaining electrode (the electrode X and the electrode Y) and the address electrode A cross. Further, in this cell 30, according to the structure of the display panel shown in FIG. 1, an R cell 30R, a G cell 30G and a B cell 30B are obtained on the basis of the colors of the correspondingly placed fluorescent substance layers 108, as shown in FIGS. 1 and 3. Further, one pixel 31 that enables a color representation is constituted by the set of the cells 30R, 30G and 30B for R, G and B which are arrayed adjacently in the horizontal direction.

Subsequently, a display driving operation for the display panel that serves as the plasma display apparatus based on the above-mentioned structure is explained.

Figure 4:
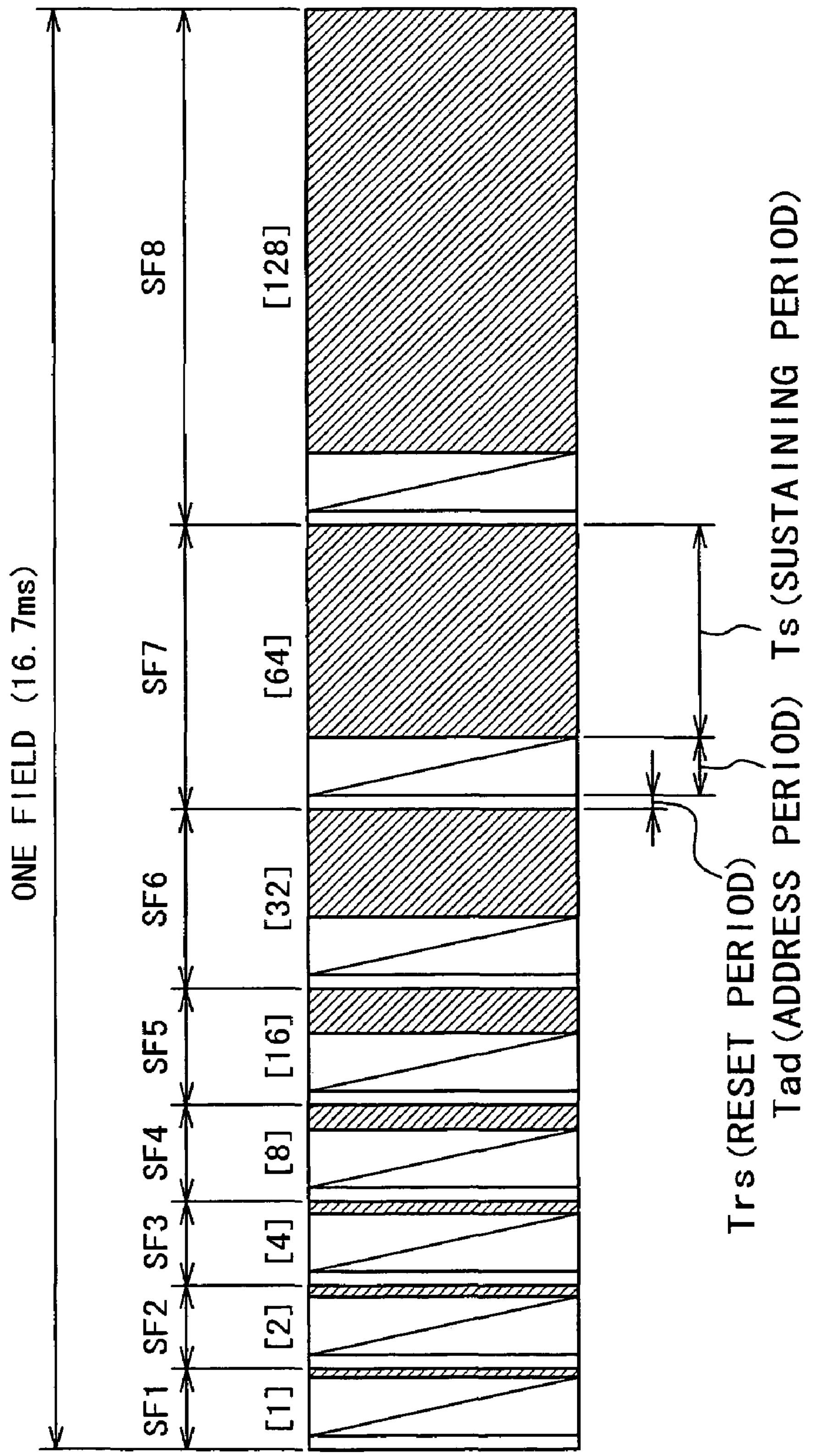
FIG. 4 is a view showing an example of a sub-field pattern employed in an embodiment of the present invention.

This embodiment is assumed such that the so-called sub-field method is used to carry out the picture display. The sub-field method divides the period corresponding to one field (=16.7 ms) into a plurality of sub-fields as shown in FIG. 4. FIG. 4 is assumed such that one field period is divided into 8 sub-fields SF1 to SF8.

Here, one sub-field period corresponding to each of the sub-fields SF1 to SF8 is provided with a reset period Trs, an address period Tad and a sustaining period Ts, as shown in FIG. 4. The operations of the respective periods will be described later.

If one field period is divided into 8 sub-fields, a binary weighting is set such that the relative ratios of the brightness to be represented by the respective sub-fields SF1 to SF8 are 1:2:4:8:16:32:64:128. Further, the brightness to be represented by the respective sub-fields SF1 to SF8 are set on the basis of this set weighting. This brightness setting is actually set in accordance with the number of the sustaining pulses applied to the electrode X and the electrode Y in the sustaining period Ts, in order to generate the surface discharge.

Here, the pulse output cycle when the sustaining pulse is applied is constant. Accordingly, as the brightness weighting as the sub-field is greater, the number of the sustaining pulses to be applied is increased, and the sustaining period Ts becomes longer. On the contrary, the lengths of the reset period Trs and the address period Tad are determined by the total number n of the column direction lines, and they are constant irrespectively of the brightness weighting.

Further, depending on the combination of the light emission/non-light emission in which such sub-fields SF1 to SF8 are used, 256 grayscales may be represented for each cell of R, G and B.

Figure 5:
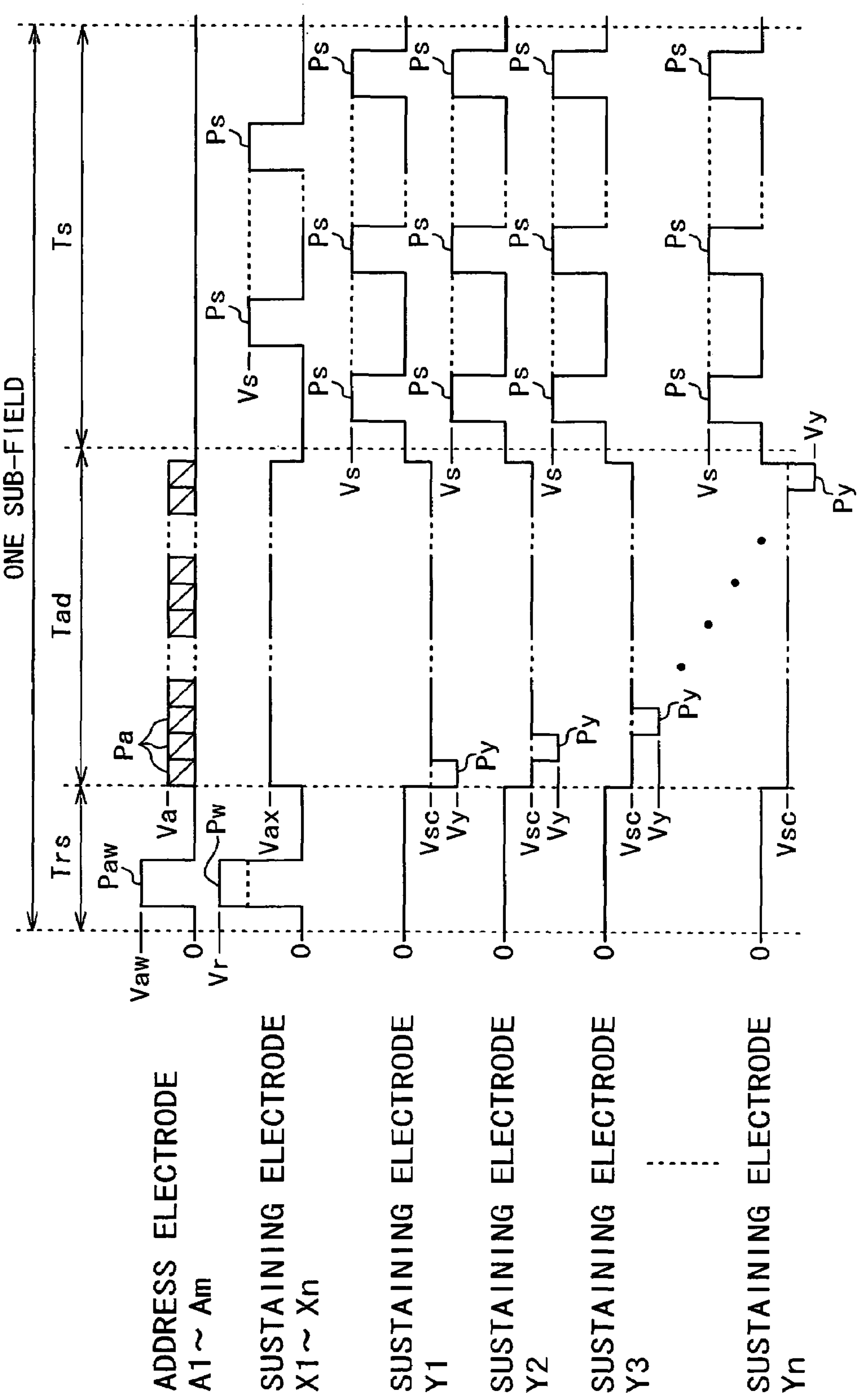
FIG. 5 is a timing chart (a waveform chart) showing an example of a drive timing (voltage application) in an electrode in a sub-field method.

The waveform view of FIG. 5 shows the display drive timing in the one sub-field period.

At first, the reset period Trs that is the first period in one sub-field period is the period in which wall charges in a horizontal line (sustaining electrode) group are removed, in order to cancel the effect of the light emission state in the sub-field period immediately before.

To do so, a write pulse Pw is simultaneously written to, for example, the sustaining electrodes X1 to Xn. Since this write pulse Pw rises up to a positive potential Vr, the strong surface discharge is generated so that a large amount of wall charges are accumulated in the dielectric layer 103. Further, depending on the trailing of the write pulse Pw, the self-discharge caused by the wall discharges accumulated at the time of the rising is generated, thereby removing the wall charges in the dielectric layer 103.

Further, in FIG. 5, a positive pulse Paw resulting from a potential Vaw is applied to the address electrodes A1 to Am, at the same output timing as the write pulse Pw. This application of the pulse Paw suppresses the inner wall surface on the display panel rear side from being electrified.

In the next address period Tad, addressing is carried out in accordance with a line order, and the light emission/non-light emission is set for each cell 30 in this sub-field period. In other words, the address period Tad is the period where the cell 30 from which the light is emitted in one sub-field period is selected.

To do so, by continuously applying a positive potential Vax with respect to a ground potential (0V) to the sustaining electrode X at this time, the state biased by this potential Vax is obtained. Further, the side of the sustaining electrode Y is biased by a negative potential Vsc.

Further, under this state, a negative scan pulse Py is sequentially applied to the sustaining electrodes Y1 to Yn. In other words, selection is carried out so as to sequentially scan the horizontal lines, for example, from the upper direction to the lower direction. Further, within the period in which the line selection is carried out by the application of the scan pulse Py, a positive addressing pulse Pa resulting from a potential Va is applied to the address electrode A corresponding to the cell from which the light is emitted on the selected line, from the address electrodes A1 to Am.

In the horizontal line which is being selected and to which the scan pulse Py is applied, in the cell 30 to which the addressing pulse Pa is applied, opposite discharge is generated between the sustaining electrode X and the address electrode A, and wall charges are produced. However, at this time, the sustaining electrode X, since biased to a potential of the same polarity as that of the addressing pulse Pa, is biased to a potential of the same polarity as that of the addressing pulse Pa. For this reason, the addressing pulse Pa is cancelled out for the sustaining electrode X. Accordingly, the discharge is not generated between the sustaining electrode X and the address electrode A.

The next sustaining period Ts is the period where the light emission state to the cell 30 from which the light is set to be emitted by the addressing in the address period Tad is maintained.

To do so, at first, a sustaining pulse Ps of a predetermined pulse width resulting from a positive potential Vs is simultaneously applied to the sustaining electrodes Y1 to Yn. Further, after the application of the sustaining pulse to those sustaining electrodes Y1 to Yn has been ended, similarly, the sustaining pulse Ps of the predetermined pulse width resulting from the positive potential Vs is simultaneously applied to the sustaining electrodes X1 to Xn. After the application of the sustaining pulse to those sustaining electrodes X1 to Xn has been ended, similarly, the sustaining pulse Ps is alternately applied to the sustaining electrodes Y1 to Yn and the sustaining electrodes X1 to Xn.

Each time the sustaining pulse Ps is applied, the surface discharge is generated between the sustaining electrode X and the sustaining electrode Y, in the cell from which the light is set to be emitted in the previous address period Tad, namely, the cell 30 in which the wall charges are accumulated.

Figure 6:
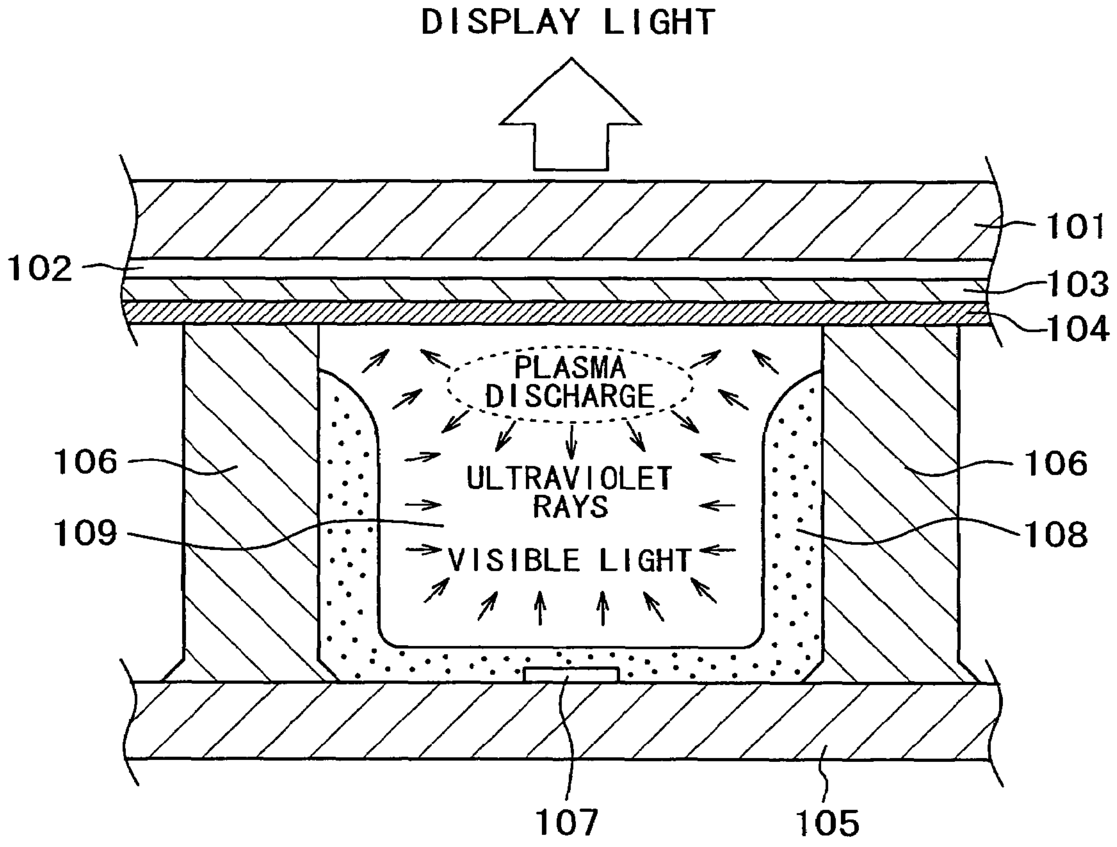
FIG. 6 is a sectional view of a display panel for explaining principle of display operation in a display panel in an embodiment of the present invention.

Here, FIG. 6 is used to explain a light emitting operation of the plasma display apparatus that employs the display panel structure according to the present embodiment. In FIG. 6, the portion corresponding to one cell 30 in the display panel having the structure according to the present embodiment is indicated by using a sectional view. Further, in FIG. 6, the same symbols are used to the same members as FIG. 1, and the explanations are omitted.

As mentioned above, since the addressing pulse Pa is applied in the address period Tad, the surface discharge is generated in response to the alternate application of the sustaining pulse Ps to the sustaining electrode 102 (the electrode X and the electrode Y), in the sustaining period Ts, in the cell 30 in which the wall charges are accumulated. This surface discharge is the plasma discharge in which the gas sealed in the discharge space 109 is at the plasma state. Accordingly, the ultraviolet rays are radiated within the discharge space 109.

Further, in reaction to this irradiation of the ultraviolet rays, the visible light is radiated from the fluorescent substance layer 108. This visible light is radiated in any color of R, G and B, correspondingly to which of the R fluorescent substance layer 108R, the G fluorescent substance layer 108G and the B fluorescent substance layer 108B is the actual fluorescent substance layer.

Further, this visible light is reflected by the fluorescent substance layer 108, and transmitted through the protective film 104, the dielectric layer 103 and the front glass substrate 101, and then radiated to the front side as the display light.

As mentioned above, in each cell 30, the light emission is controlled so as to be lighted, in accordance with the principle explained in FIG. 6. Further, such a lighting operation is done by the displaying drive based on the sub-field method already explained in FIGS. 4, 5. Accordingly, in each cell 30, the light emission is controlled so as to obtain the necessary brightness in the range of the 256 grayscales, within one field period.

The plasma display apparatus in the present embodiment is designed so as to have the shape size corresponding to the aspect ratio of 16:9 in the display panel having the above-mentioned structure. Further, if the image signal inputted for the picture display has the aspect ratio of 4:3, it is laterally expanded to the picture having the aspect ratio of 16:9. Accordingly, it may be displayed by using the entire display region of the display panel.

Figure 13A:
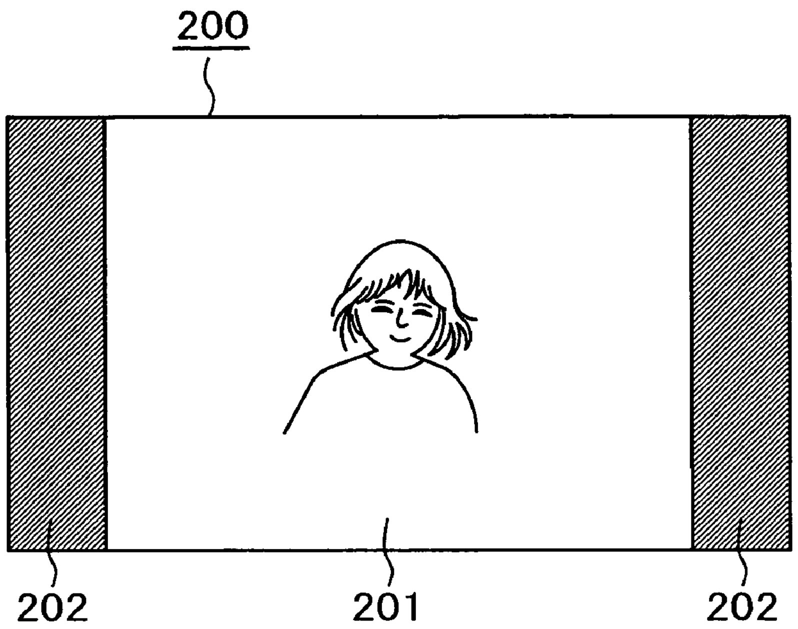
FIGS. 13A, 13B are views showing an implementation example in which a picture area and a side panel are displayed within the same display screen.

However, in this case, since the displayed picture is laterally extended and distorted, it may be also displayed in its original aspect ratio of 4:3. Further, in this case, for example, as shown in FIG. 13A, the picture area 201 resulting from the image signal having the aspect ratio of 4:3 is placed at the center in the lateral direction within the display panel 200. This picture area 201 has the aspect ratio of 4:3, and the longitudinal width of the display panel 200 is fully used in the longitudinal direction. Further, in the display panel 200, the no-picture regions on both of the right and left sides of the picture area 201, on which the picture is not displayed, are defined as the side panels 202, 202

Further, the present embodiment is designed such that the side panels 202, 202 are not in the perfect black (namely, null display brightness), and gray display to which a certain degree of brightness is given is carried out. This is an countermeasure to prevent a so-called burn-in from becoming apparent at the boundary between the side panel 202 and the picture area 201, as described in the related art.

In other words, the plasma display apparatus carries out the light emission display in accordance with the principle explained in FIG. 6. Accordingly, the fluorescent substance layer 108 is deteriorated by the factors, such as the ultraviolet rays irradiated by the surface discharge within the discharge space 109, the shock of the ionized gas and the like.

The deterioration in the fluorescent substance layer 108 appears as the drop in the brightness. Accordingly, if the fluorescent substance layer 108 in a fixed display region portion is further deteriorated as compared with the other regions, the difference of the brightness is induced between it and the circumferential display region. This difference results in the phenomenon of the burn-in. If the burn-in is induced, for example, the burn-in portion is viewed in such a way that it overlap with the display picture as a fixed pattern. Hence, this is not desirable because the quality of the display picture is damaged.

Figure 13B:
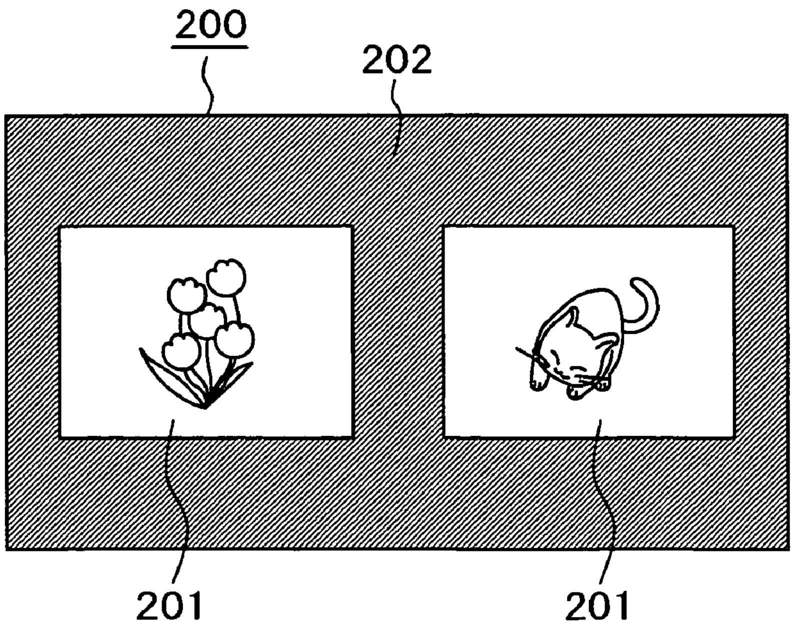

Further, in the situation that the picture area 201 and the side panel 202 are displayed as shown in FIGS. 13A, 13B, the boundary between the picture area 201 and the side panel 202 is almost fixed, and they are displayed for a long time in many case. Accordingly, the progress in the burn-in is rapid and outstanding on the boundary between the picture area 201 on which the picture is displayed and the side panel 202 steadily displayed in the brightness close to the black.

So, if the gray display to which a certain degree of brightness is given is employed on the side of the side panel 202, the deterioration in the fluorescent substance of the panel portion corresponding to the side panel 202 is progressed correspondingly thereto, which reduces the difference of the progress degree of the deterioration in the fluorescent substance from the panel portion corresponding to the picture area 201. As a result, it is possible to make the burn-in inconspicuous. Such a method is advantage because there is no case that the picture area 201 becomes dark which reduces the image quality, differently from the case of employing the method which drops the display brightness of the picture area 201, for example, after making the side panel 202 substantially black (null display brightness), as described in the related art.

In addition, the present embodiment is designed such that the visual brightness with a substantially constant value may be maintained, in such a way that the display brightness is not changed in the region of the side panel 202, although the display brightness of the picture on the display panel is dynamically varied by the PLE control. This point will be described below.

Figure 7:
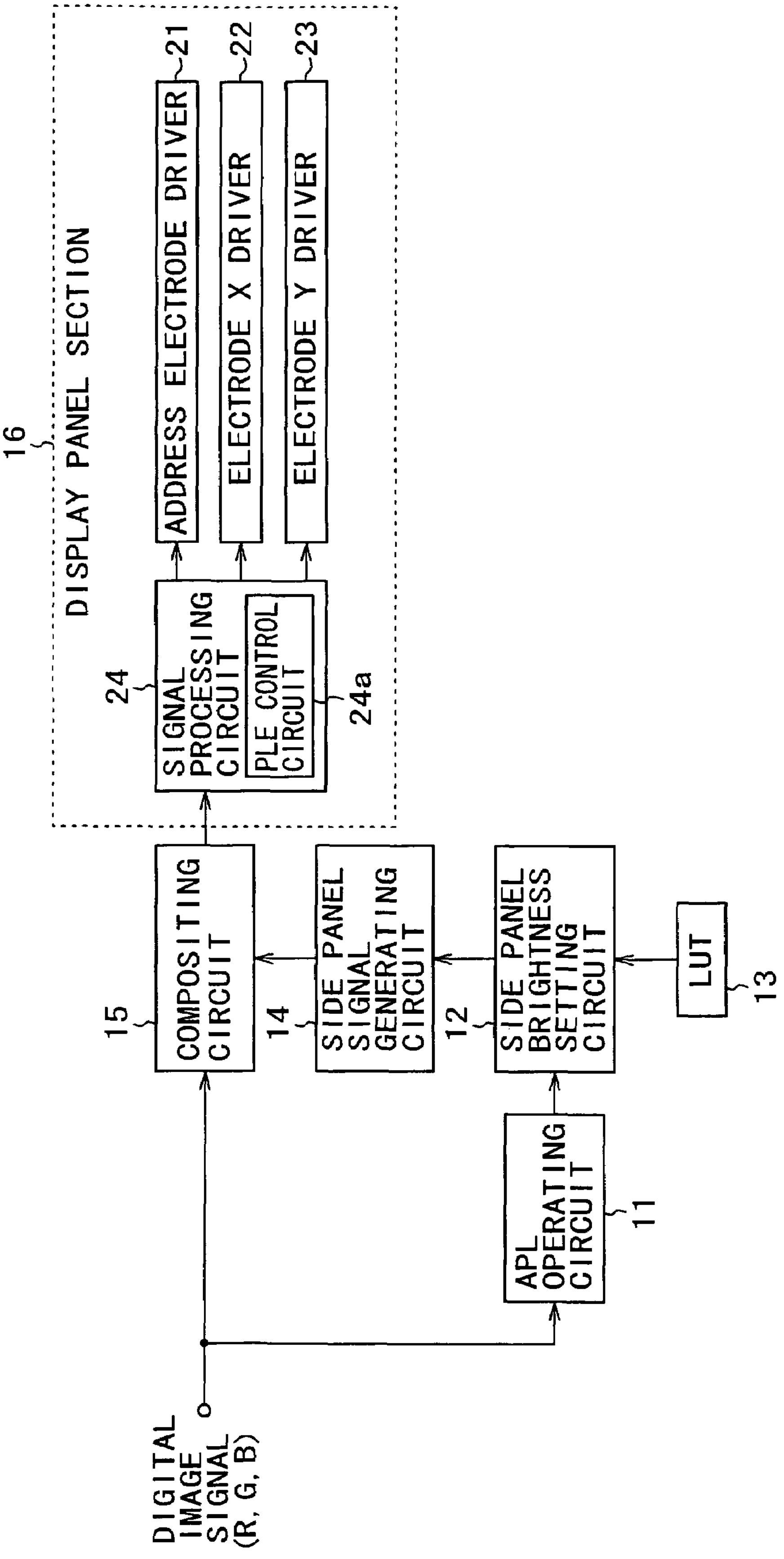
FIG. 7 is a block diagram showing a configuration example of a plasma display apparatus according to an embodiment of the present invention.

FIG. 7 shows the configuration to carry out the display by means of the side panel 202 and the picture area 201 having the aspect ratio of 4:3, as shown in FIG. 13A, when receiving the image signal for, for example, displaying the aspect ratio of 4:3 in the plasma display apparatus of the present embodiment.

The plasma display apparatus is designed so as to obtain the digital image signals of R, G and B, by performing a gamma correcting process and an A/D converting process, which are well known, for example, on an input analog image signal. Those digital image signals of R, G and B are input to the circuit shown in FIG. 7.

The input digital image signal (the input image signal) is branched and inputted to an APL operating circuit and a compositing circuit 15. Further, for the convenience of later explanation, the input image signal in this case is assumed to correspond to the picture having the aspect ratio of 4:3.

The compositing circuit 15 synthesizes the digital image signal (the side panel image signal) for the side panel 202 generated by a side panel signal generating circuit 14, with the input image signal having the aspect ratio of 4:3, and outputs as a composite image signal. Depending on the composite image signal of one field unit, as shown in FIG. 13A, the input image signal portion having the aspect ratio of 4:3 is displayed as the picture area 201 having the same aspect ratio of 4:3. Further, depending on the side panel image signal portion generated by the side panel signal generating circuit 14, the region is displayed as the side panel 202.

Further, the side panel signal generating circuit 14 generates the side panel image signal having the brightness level set by the circuit member including the APL operating circuit 11, a side panel brightness setting circuit 12 and a lookup table (LUT) 13. The setting of the brightness level for this side panel image signal will be described later.

The composite image signal outputted from the compositing circuit 15 is inputted to a signal processing circuit 24 inside a display panel section 16.

The signal processing circuit 24 controls an address electrode driver 21, an electrode X driver 22 and an electrode Y driver 23 which are also shown in FIG. 2, in accordance with the input composite image signal. In other words, the display brightness of each cell 30 (30R, 30G and 30B) in one field period is set in accordance with the input composite image signal. Further, the voltage applying operations to the address electrode driver 21, the electrode X driver 22 and the electrode Y driver 23 are controlled such that the sustaining pulses of the number corresponding to the set display brightness are applied to each pixel, for example, in accordance with the sub-field method shown in FIG. 4.

Further, the signal processing circuit 24 executes the PLE (Peak Luminance Enhancement) control in setting the above-mentioned display brightness. To do so, a PLE control circuit 24*a* is included as shown in FIG. 7.

Figure 8:
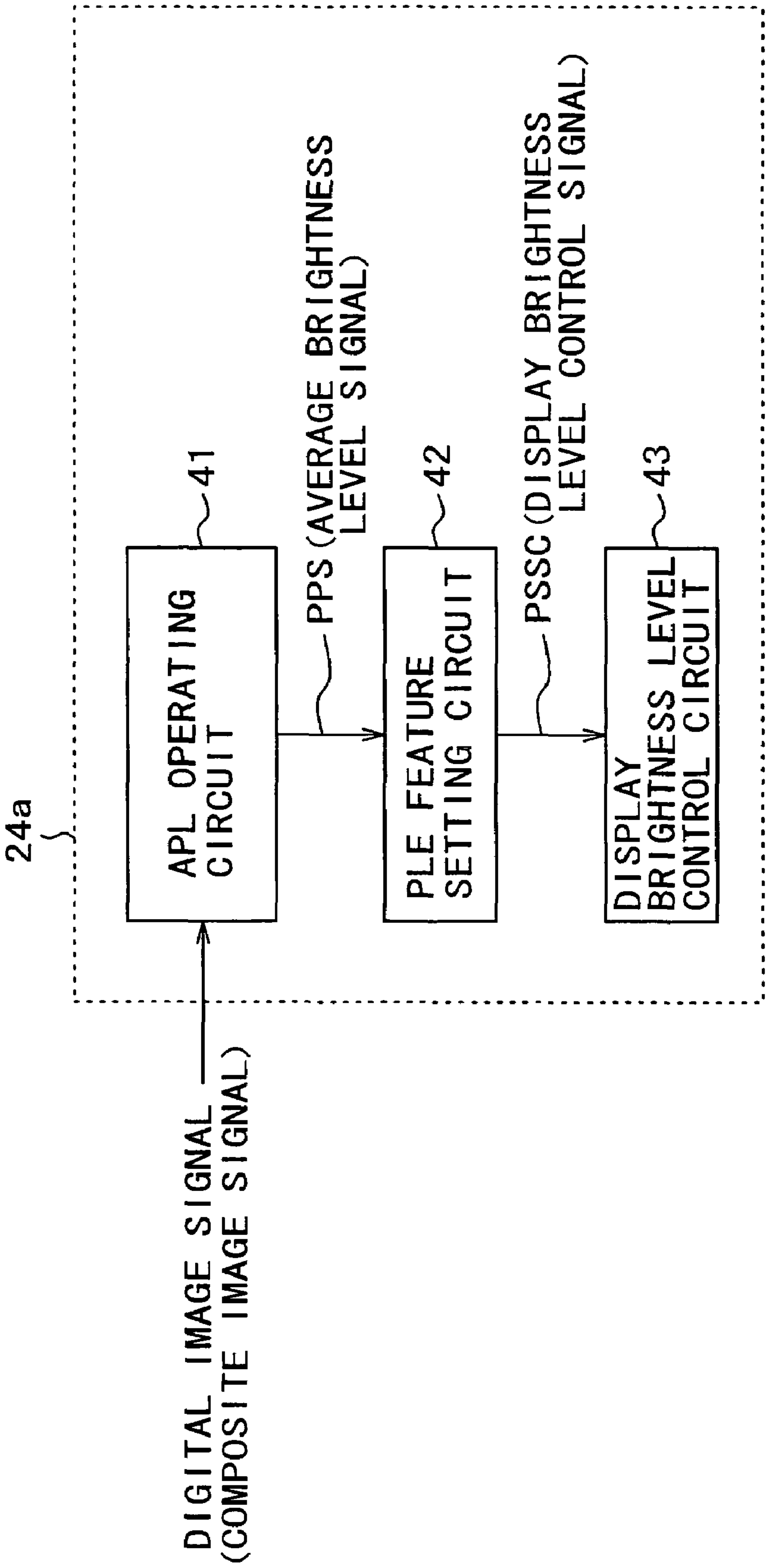
FIG. 8 is a block diagram showing a configuration example of a PLE control circuit.

FIG. 8 shows the inner configuration example of the PLE control circuit 24*a*. As shown in FIG. 8, the PLE control circuit 24*a* is provided with an APL operating circuit 41, a PLE property setting circuit 42 and a display brightness level control circuit 43.

The digital image signal is inputted to the PLE control circuit 24*a*. If the instant configuration is to be corresponded with the configuration previously shown in FIG. 7, the composite image signal, which is outputted from the compositing circuit 15 and on which a predetermined signal processing is performed as necessary, is inputted.

However, for the purpose of confirmation, the PLE control is the process that should be always executed at the time of the picture display. For example, if the image signal having the aspect ratio of 16:9 is outputted and displayed, the side panel image signal need not be composited. Accordingly, in such a case, the input image signal in which the side panel image signal is not composited is inputted as a target of the PLE control.

The digital image signal inputted to the PLE control circuit 24*a* is firstly inputted to the APL operating circuit 41.

The APL operating circuit 41 calculates the average brightness level for each field, with regard to the input digital image signals, and outputs an average brightness level signal PSS indicative of the value of the calculated average brightness level to the PLE property setting circuit 42. Further, this APL operating circuit 41 and the APL operating circuit 11 shown in FIG. 7 have the similar function. Accordingly, the APL operating circuit 41 and the APL operating circuit 11 may have the similar circuit configuration.

The average brightness level signal PSS outputted by the APL operating circuit 41 is inputted to the PLE property setting circuit 42.

The PLE property setting circuit 42 sets the PLE control property corresponding to the average brightness level. The PLE property setting circuit 42 has information of the display brightness level to be set correspondingly to the average brightness level, as information of the PLE control property, and sets the display brightness level (the PLE control property) corresponding to the value of the average brightness level indicated by the input average brightness level signal PSS. Further, it outputs a display brightness level control signal PSSC indicative of the value of this set display brightness level to the display brightness level control circuit 43.

The display brightness level control circuit 43 executes the control so that the field picture display is carried out on the basis of the brightness corresponding to the input display brightness level control signal PSSC. In other words, it determines the sustaining pulse number (namely, the display brightness) to be applied to each cell, in order to display a current field picture, so as to obtain the brightness corresponding to the display brightness level control signal PSSC. Further, it executes the drive based on the sub-field method, by controlling the address electrode driver 21, the electrode X driver 22 and the electrode Y driver 23, so as to obtain the light emitting operation of this determined sustaining pulse number.

Figure 9:
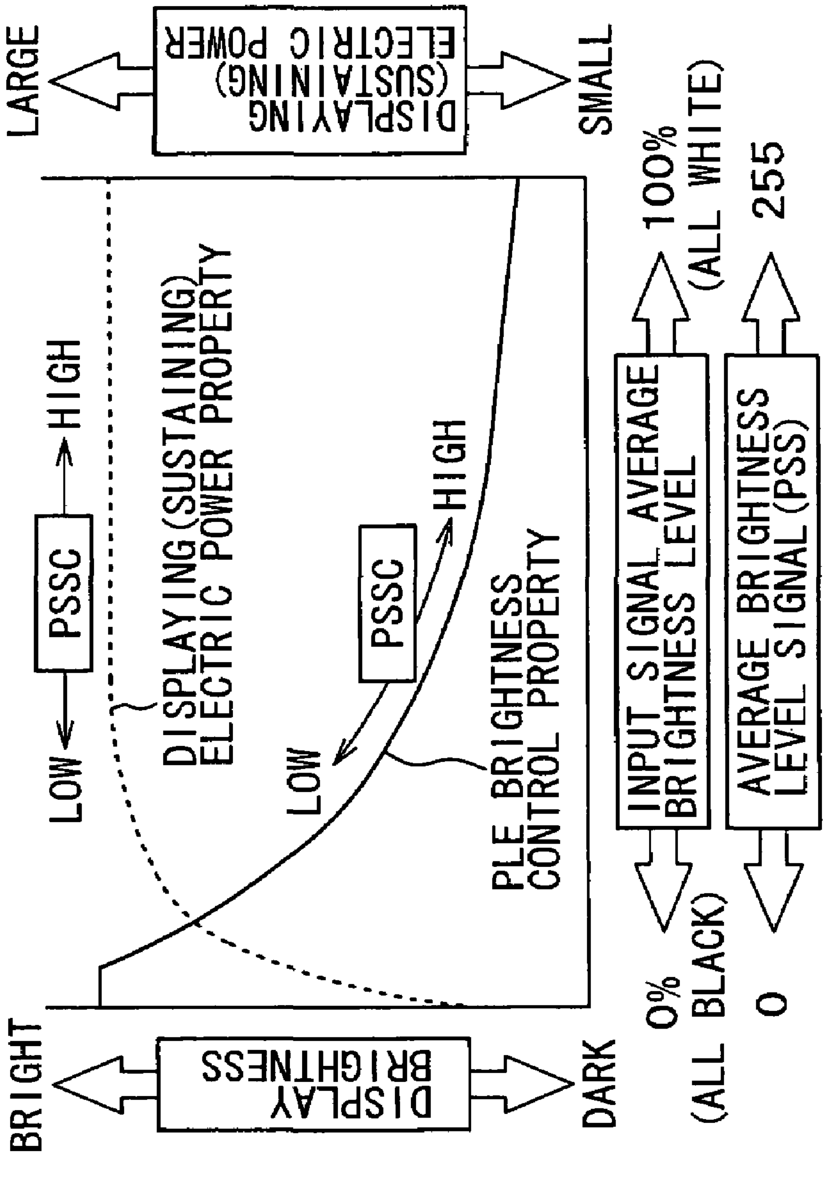
FIG. 9 is a block diagram showing an example of a PLE control property set by a PLE control circuit.

FIG. 9 shows an example of the PLE control property.

In FIG. 9, the lateral axis indicates the value of the input signal average brightness level (the average brightness level of the digital image signals) and the average brightness level signal PSS, and the longitudinal axis indicates the actually displayed display brightness and the display (sustaining) electric power at the time of the display. Here, as the input signal average brightness level on the lateral axis, it shows the range between 0% (all black) and 100% (all white). As can be understood from the explanation of FIG. 8, the average brightness level signal PSS indicated on the same lateral axis is the digital value into which the input signal average brightness level is converted. Accordingly, the average brightness level signal PSS and the input signal average brightness level correspond to each other. The average brightness level signals PSS in this case are represented in the 256 stages between 0 and 255, with regard to the input signal average brightness levels between 0% (all black) and 100% (all white).

Further, as the display brightness level control signal PSSC obtained on the basis of the average brightness level signal PSS, the PLE brightness control property and the display (sustaining) electric power property are reflected as the PLE control property. In other words, the value of the display brightness level control signal PSSC is set such that the control for reducing the display brightness in accordance with the indicated property is firstly executed on the basis of the shift of the input signal average brightness level from 0% to 100%. Further, so as to obtain the display (sustaining) electric power in accordance with the indicated property on the basis of the shift of the input signal average brightness level from 0% to 100%, the value thereof should be set. Further, the display (sustaining) electric power property is designed so as to be almost constant, depending on the input signal average brightness level (the average brightness level signal PSS) of a certain predetermined constant value or more.

With the execution of the PLE control as mentioned above, even if the signals have the same brightness level, the display brightness level is set higher if the average brightness level of the input image signals is set to a lower value, thereby carrying out the display of the higher brightness. Further, if the average brightness level is higher and brighter, the display brightness level is set lower, thereby suppressing the electric power consumption. As a result, for example, as shown in FIG. 9, the property that the display electric power is almost constant is obtained irrespectively of the average brightness level of the input image signals. This results in the drop in the maximum electric power consumption when the image signal having the higher average brightness level is displayed as the picture. Further, pictures having preferable contrast may be displayed by the use of the input image signal having the lower average brightness level.

In addition, the present embodiment is designed such that the brightness level of the side panel image signal generated by the side panel signal generating circuit 14 is not constant and it is varied on the basis of the average brightness level of the input digital image signal (the image signal of the picture having the aspect ratio of 4:3). As a result, the brightness of the side panel 202 is not changed when the PLE control is done to carry out the picture display. In other words, for example, when the picture display is done as shown in FIGS. 13A, 13B, with regard to the display region of the picture area 201, the display brightness is dynamically changed on the basis of the input signal brightness level by the PLE control, for example, as shown in FIG. 9. On the contrary, with regard to the display region of the side panel 202, the display brightness is not almost changed. This point will be described below.

In FIG. 7, the digital image signal of R, G and B inputted to the compositing circuit 15 is averaged for each pixel, branched and inputted to the APL operating circuit 11 as well.

The APL operating circuit 11 calculates the average brightness level for each field unit, with regard to this input digital image signal. Here, what is noted is the fact that the image signal inputted to this APL operating circuit 11 is the image signal before it is composited with the side panel 202 by the compositing circuit. Accordingly, it is the image signal only in the region of the picture, for example, having the aspect ratio of 4:3.

The average brightness level obtained by the APL operating circuit 11 is inputted to the side panel brightness setting circuit 12.

Here, as mentioned above as the conventional problem, if the brightness level of the side panel image signal is fixed, as the display picture obtained by compositing this side panel image signal portion with the image signal of the picture, for example, having the aspect ratio of 4:3 and then further carrying out the PLE control, the display brightness of the portion of the side panel 202 is dynamically changed on the basis of the average brightness level of the image signal of the picture having the aspect ratio of 4:3. However, if this is reversely considered, by varying the brightness level of the side panel image signal to be composited with this image signal of the picture having the aspect ratio of 4:3 on the basis of the average brightness level of the image signal of the picture having the aspect ratio of 4:3, the display brightness of the portion of the side panel 202 in the display picture on which the PLE control is performed may be made constant.

FIG. 10 shows the specific setting example of the brightness level (the side panel data) of the side panel image signal to the average brightness level (APL) of the image signal of the picture having the aspect ratio of 4:3, in order to make the display brightness of the portion of the side panel 202 constant.

For example, as shown in FIG. 10, the side panel data (the brightness level) is set, correspondingly to the average brightness level (APL) of the image signal of the picture having the aspect ratio of 4:3. In this case, the average brightness level (APL) of the image signal of the picture having the aspect ratio of 4:3 is classified into 101 stages between 0% (all black) and 100% (all white). The side panel data (the brightness level) is assumed to have the resolution of the 256 stages between 0 and 255.

As can be understood from FIG. 10, it is understood that the side panel data (the brightness level) is set to be gradually increased in the range between 6/255 and 26/255, as the average brightness level (APL) of the image signal of the picture having the aspect ratio of 4:3 becomes higher.

Further, by setting the side panel data (the brightness level) as mentioned above, the actual brightness of the side panel 202 obtained by the PLE control, namely, the brightness obtained by measuring the side panel 202 actually displayed on the display panel on the basis of the display brightness level in accordance with the display brightness level control signal PSSC falls in the range between about 9 and 10 (10±1) cd/m$^2$, irrespectively of the average brightness level (APL) of the image signal of the picture having the aspect ratio of 4:3, as shown in FIG. 10. Accordingly, the apparent brightness implying the brightness when the side panel 202 displayed on the basis of the above-mentioned actual brightness is visually viewed by human eyes becomes constant, irrespectively of the average brightness level (APL) of the image signal of the picture having the aspect ratio of 4:3, as shown in FIG. 10.

When the explanation is returned back to FIG. 7, the side panel brightness setting circuit 12 sets the brightness level (the side panel data) of the side panel image signal shown in FIG. 10, on the basis of the average brightness level (APL) of the image signal of the picture having the aspect ratio of 4:3, which is inputted from the APL operating circuit 11. Concretely, if the average brightness level (APL) of the image signal of the picture having the aspect ratio of 4:3 has the value indicative of 10%, 7/255 is set as the side panel data.

Further, in setting the brightness level of such a side panel image signal, the table information to which the value as the side panel data is correlated and the like are stored, for each average brightness level (APL) of the image signal of the picture having the aspect ratio of 4:3 between 0 and 100%, for example, as shown in FIG. 10, in the lookup table 13 shown in FIG. 7. The side panel brightness setting circuit 12 reads the value of the side panel data correlated to the value of the input average brightness level (APL) from the lookup table 13 and sets it. Accordingly, 7/255 is set as the side panel data (the brightness level of the side panel image signal).

Further, the side panel brightness setting circuit 12 outputs the value of the brightness level of the side panel image signal set as mentioned above, to the side panel signal generating circuit 14. The side panel signal generating circuit 14 generates the side panel image signal corresponding to one field having the input brightness level value, and outputs to the compositing circuit 15.

This side panel image signal is composited with the image signal of the picture having the aspect ratio of 4:3 by the compositing circuit 15, and inputted to the signal processing circuit 24. Further, the PLE control is performed on it, and it is displayed and outputted. Accordingly, as can be understood from the explanations until this time, the brightness of the side panel 202 displayed on the display panel appears to be constant.

Here, for reference, FIG. 11 shows the relation between the actual brightness and the average brightness level of the image signal of the picture of 4:3, if the brightness level (the side panel data) of the side panel image signal outputted to the compositing circuit 15 from the side panel signal generating circuit 14 is constant.

In FIG. 11, the side panel data is 26/255 and constant, with regard to the average brightness level (APL) of the image signal of the picture of 4:3 between 0 and 100%. In this case, it is understood that the actual brightness of the side panel in the picture that is displayed on the display panel after the PLE control is performed is largely changed between 40.0 cd/m$^2$ and 10.0 cd/m$^2$, as the average brightness level (APL) of the image signal of the picture of 4:3 becomes higher, as shown in FIG. 11. Further, although not shown in FIG. 11, in the displaying based on this actual brightness, the corresponding change appears as the apparent brightness. Accordingly, the change in the brightness of the side panel 202 is clearly recognized in view of the visual manner.

Figure 12A:
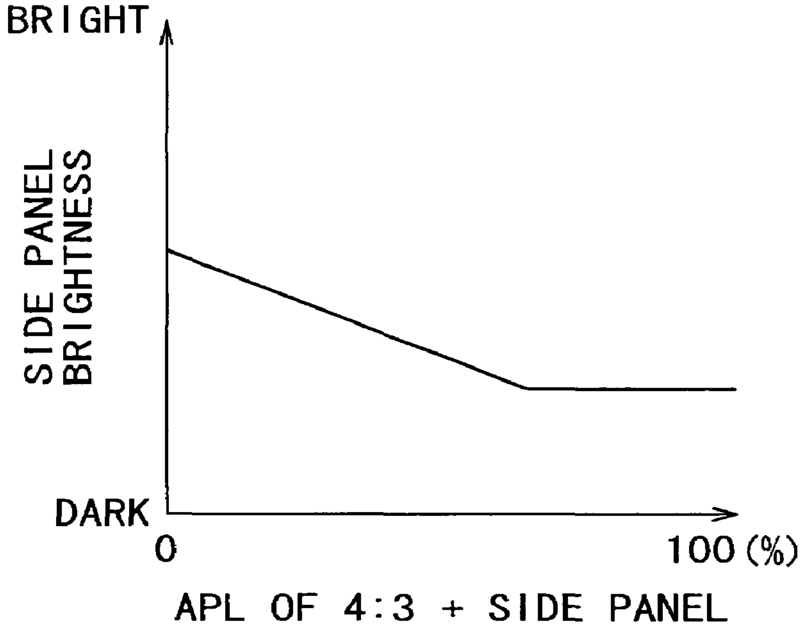
FIGS. 12A, 12B are views showing a relation of a brightness change in a side panel with respect to a average brightness level change in an image signal of a picture of 4:3 for cases such that the brightness level of a side panel image signal is fixed and that the brightness level of the side panel image signal is varied on the basis of the average brightness level of an image signal of a picture of 4:3.
Figure 12B:
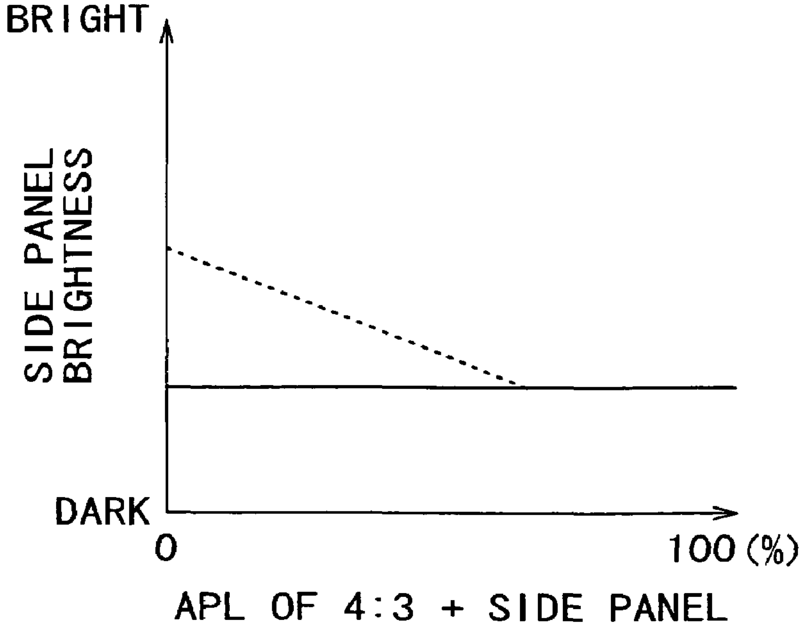

Further, FIG. 12A graphs the relation between the side panel brightness and the average brightness level (APL) of the image signal of the picture of 4:3, in the case that the brightness level of the side panel image signal is fixed, and FIG. 12B graphs the relation in the case that it is varied on the basis of the average brightness level (APL) of the image signal of the picture of 4:3. In FIGS. 12A, 12B, the lateral axis indicates the average brightness level (APL) of the image signal of the picture of 4:3, and the longitudinal axis indicates the side panel brightness. Further, the side panel brightness in this case indicates, for example, the actual brightness or the apparent brightness.

In the case of FIG. 12A, as can be understood by referring to FIG. 12A, the brightness of the side panel 202 becomes higher as the average brightness level (APL) of the image signal of the picture of 4:3 becomes lower, and it becomes reversely lower, as the average brightness level (APL) of the image signal of the picture of 4:3 becomes higher. Accordingly, it is possible to obtain such a property that the APL value becomes constant if the APL becomes a certain value or more. This property also appears as the relation between the actual brightness and the average brightness level (APL) of the image signal of the picture of 4:3, for example, which is specifically shown in FIG. 11.

On the contrary, FIG. 12B shows the case that the brightness level of the side panel image signal is variably set, on the basis of the average brightness level (APL) of the image signal of the picture of 4:3, for example, as shown in FIG. 10. In this case, as indicated by the solid line in FIG. 12B, the brightness of the side panel 202 is constant, with regard to the increase or decrease in the average brightness level (APL) of the image signal of the picture of 4:3. Even this property appears as the relation between the actual brightness and the average brightness level (APL) of the image signal of the picture of 4:3, in FIG. 10.

Further, the present invention is not limited to the configuration as the above-mentioned embodiment. For example, in the explanations until this time, the case that the no-picture region as the side panel is formed on both of the sides of the picture of 4:3 as shown in FIG. 13A has been exemplified, under the assumption of the display panel having the aspect ratio of 16:9. However, the present invention may be applied to even the case that the plurality of picture areas 201 are displayed and the remaining regions are then used as the no-picture regions as the side panel, for example, as shown in FIG. 13B. Moreover, when an image signal of an image source such as a movie or the like is displayed on the display panel having the aspect ratio of 4:3, the no-picture regions are formed on upper and lower portions. However, the present invention may be applied to even this case. In other words, the present invention may be generally applied to the case that the picture region and the no-picture regions are displayed on the same screen.

Further, the present invention may be applied to a display apparatus outside the plasma display apparatus, in which the picture region and the no-picture region are displayed on the same screen, and the control for carrying out the brightness level conversion such as the PLE control is performed.

What is claimed is:

1. A display apparatus, comprising:

display means including a display screen of an aspect ratio that is different from an aspect ratio of an image corresponding to an input image signal;

image signal generating means for generating an image signal corresponding to a no-picture region of a display region on the display screen, the no-picture region being a remaining portion of the display region in which a picture region of the image is excluded;

composing means for generating a composite image signal in which an image signal for the no-picture region is combined with the input image signal;

display brightness level setting means for setting a display brightness level for the composite image signal based on an average brightness level of the composite image signal from the means;

display drive means for driving the display means to a brightness in accordance with the display brightness level set by said display brightness level setting means;

average brightness level detecting means for detecting an average brightness level of the input image signal; and no-picture brightness level setting means for setting a brightness level of the image signal for the no-picture region prior to setting the display brightness level for the composite image signal, the setting of the brightness level of the image signal for the no-picture region being based on the average brightness level detected by the average brightness level detecting means such that the display brightness level of the no-picture region, after setting the display brightness level for the composite image signal, is substantially constant.

2. The display apparatus according to claim 1 wherein:

the display brightness level setting means sets the display brightness level higher in a case that the average brightness level of the composite image signal is lower, and sets the display brightness level lower in a case that the average brightness level of the composite image signal is higher and also when the brightness levels in both cases are equal.

3. The display apparatus according to claim 1, wherein the display screen has an aspect ratio elongated in a lateral direction as compared with a 4:3 aspect ratio, the picture region has the 4:3 aspect ratio and is placed at a center in the lateral direction of the display screen having the laterally elongated aspect ratio, and the no-picture region is formed in both of right and left sides of the picture region.

4. The display apparatus according to claim 1, wherein, on the display screen, pixels are formed from respective display cells of three primary colors, and a grayscale representation is performed by controlling a light emission period of the display cell for each of a plurality of sub-fields, the sub-field being formed by dividing one field, the input image signal includes image signals of three primary colors respectively corresponding to the display cells of three primary colors, and each of the image signals of three primary colors is averaged for each pixel and supplied to the average brightness level detecting means.

5. The display apparatus according to claim 1, wherein the no-picture brightness level setting means comprises a look-up table in which no-picture region data is cross-referenced to average brightness level of the input image signal.

6. A method of displaying a picture, comprising:

a displaying step producing a display on a display screen of an aspect ratio that is different from an aspect ratio of an image corresponding to an input image signal;

a generating step for generating an image signal corresponding to a no-picture region of a display region on the display screen used in the displaying step, the no-picture region being a remaining portion of the display region in which a picture region of the image is excluded;

a composing step for generating a composite image signal in which an image signal for the no-picture region is combined with the input image signal;

a setting step for setting a display brightness level for the composite image signal based on an average brightness level of the composite image signal;

an average brightness level detecting step for detecting an average brightness level of the input image signal; and a no-picture brightness level setting step for setting a brightness level of the image signal for the no-picture region prior to setting the display brightness level for the composite image signal, the setting of the brightness level of the image signal for the no-picture region being based on the average brightness level detected in the average brightness level detecting step such that the display brightness level of the no-picture region, after setting the display brightness level for the composite image signal is substantially constant.

7. The method of displaying a picture according to claim 6, the display brightness level setting step sets the display brightness level higher in a case that the average brightness level of the composite image signal is lower, and sets the display brightness level lower in a case that the average brightness level of the composite image signal is higher and also when the brightness levels in the both cases are equal.

8. The method of displaying a picture according to claim 6, wherein the input image signal includes image signals of three primary colors respectively corresponding to the display cells of three primary colors, and the average brightness level is detected on a basis of each of image signals of three primary colors, which is averaged for each pixel in the average brightness level detecting step.

9. A display apparatus, comprising:

a display including a display screen;

an image signal generating section for generating an image signal corresponding to a no-picture region of a display region displaying on the display screen of the display, the no-picture region being a remaining portion of the display screen in which a picture region is excluded, the picture region displaying an input image signal;

a composing section for generating a composite image signal in which an image signal for the no-picture region is combined with the input image signal;

a display brightness level setting section for setting a display brightness level for the composite image signal based on an average brightness level of the composite image signal from the composing section;

a display driver for driving the display to obtain a brightness in accordance with the display brightness level set by said display brightness level setting section;

an average brightness level detecting section for detecting an average brightness level of the input image signal; and a no-picture brightness level setting section for setting a brightness level of the image signal for the no-picture region prior to setting the display brightness level for the composite image signal, the setting of the brightness level of the image signal for the no-picture region being based on the average brightness level detected by the average brightness level detecting section such that the display brightness level of the no-picture region, after setting the display brightness level for the composite image signal is substantially constant.

* * * * *